United States Patent [19]

Cage et al.

[11] Patent Number: 4,955,239

[45] Date of Patent: Sep. 11, 1990

[54] APPARATUS FOR ELECTRICALLY INTERCONNECTING VIBRATING STRUCTURES

[75] Inventors: Donald R. Cage, Longmont; Dean E. Lowe, Boulder, both of Colo.

[73] Assignee: Micro Motion, Inc., Boulder, Colo.

[21] Appl. No.: 377,324

[22] Filed: Jul. 10, 1989

Related U.S. Application Data

[63] Continuation of Ser. No. 272,209, Nov. 17, 1988, abandoned, which is a continuation of Ser. No. 865,715, May 22, 1986, abandoned.

[51] Int. Cl.$^5$ .............................................. G01F 1/84
[52] U.S. Cl. ................................ 73/861.38; 174/117 F; 439/33
[58] Field of Search ............ 73/861.37, 861.38, 32 A, 73/272 R; 174/69, 86, 72 A, 117 F; 439/32, 33

[56] References Cited

U.S. PATENT DOCUMENTS

| | | | |
|---|---|---|---|
| 1,588,556 | 6/1926 | Thompson | 439/33 |
| 3,168,617 | 2/1965 | Richter | 174/117 |
| 3,214,725 | 10/1965 | De Rose et al. | 339/151 |
| 3,267,402 | 8/1966 | Reimer | 336/200 |
| 3,422,213 | 1/1969 | Webb | 174/72 |
| 3,551,585 | 12/1970 | Smart | 174/72 |
| 3,633,189 | 1/1972 | Billawala | 340/174 |
| 3,818,122 | 6/1974 | Luetzow | 174/86 |
| 4,000,558 | 1/1977 | Cahill | 29/625 |
| 4,065,199 | 12/1977 | Anore et al. | 339/17 |
| 4,132,110 | 1/1979 | Muramoto | 73/32 |
| 4,255,853 | 3/1981 | Campillo et al. | 29/843 |
| 4,381,680 | 5/1983 | Shiota | 73/861.38 |
| 4,422,338 | 12/1983 | Smith | 73/861.38 |
| 4,460,804 | 7/1984 | Svejkovsky | 174/117 F |
| 4,705,573 | 8/1985 | Cage et al. | |
| 4,705,590 | 8/1985 | Cage | |

OTHER PUBLICATIONS

Dupont, KAPTON polymide film . . . for cost saving assembly and improved performance of flexible printed circuits.
Interconics, Flexible Circuit Interconnects.
Dr. Samuel Gazit/Rogers Corporation, Bendable Laminates, A New Concept in Circuit Design, May 1985.
Rogers Corporation, Bend Flex Bendable Laminates Design Guide, 1985.
Rogers Corporation, Formable Reinforced Epoxy Laminates for Printed Circuits.
Dowty, Dowty Circuits Limited, Sculptured Circuits.
Dupont, Pyralux—A System You Can Rely On for Flexible Circuitry.
Etchit, Inc., Make it picture perfect.
Optifab, Inc.—Optifab, Inc. is a precision phogographic facility supplying state-of-the art services for semi conductor thick and thin film, printed circuits, photo fabrication . . .
Dupont, Pyralax Product Information Guide.
Dupont, Storage of Pyralax Flexible Composite Materials, Jun. 1986.
Dupont, Standard Quality Specification $1,000, Pyralux Wa/k Cover Sheet and Bond Ply, Jun. 1983.
Dupont, Pyralux WA Specimen Preparation Test Materials, Sept. 1985.
Dupont, Design Advantages of "KAPTON" Polymide Film in Flexible Circuitry.
Dupont, KAPTON General Specifications bulletin GS-85-3, Jan. 1985.
Dupont, KAPTON Industry Specifications Bulletin GS-85-2, Jan. 1985.
Dupont, KAPTON Price List, Jan. 1985.
Dupont, KAPTON Ordering Guide, Jan. 1985.
Dupont, Kapton for innovative solutions to extreme-temperature design engineering problems.
Flexprint Wiring handbook; Saunders Assoc. Inc., pp. 3-5, 19-22 and 32, 1960.
IRC Design Data Manual, pp. 2,5,13,15,17 and 30, 1962.

Primary Examiner—Herbert Goldstein

[57] ABSTRACT

An apparatus comprising an insulated flexible circuit having conductors therein for electrically interconnecting vibrating structures having a half-loop shaped section between the structures so that the vibration does not cause fatigue and breaking of the conductors or insulation and which also minimizes coupling of mechanical forces between the structures that can alter vibrating motion of the structures. The flexible circuit apparatus is particularly useful for Coriolis type mass flow metering devices.

10 Claims, 2 Drawing Sheets

APPARATUS FOR ELECTRICALLY INTERCONNECTING VIBRATING STRUCTURES

This application is a continuation of application Ser. No. 272,209, filed Nov. 17, 1988, now abandoned, which is a continuation of appl. Ser. No. 865,715, filed May 22, 1986 now abandoned.

BACKGROUND OF THE INVENTION

1. Field of the Invention

The invention set out and claimed here relates to providing electrical conductors for signal transmission between two mechanical structures, at least one of which is vibrating with respect to the other. The electrical conductors can be insulated with respect to each other and are arranged between the vibrating structures so that vibration does not cause fatigue and breaking of the conductors and also minimizes coupling of mechanical forces and damping between the structures.

2. Description of the Prior Art

The arrangements for mounting wires for transmission of electrical signals between vibrating structures which are continuously vibrated are in part limited by several consequences arising from the vibration. Prolonged alternating motion of wires can cause the wires to experience fatigue which leads to their breaking, or can lead to their kinking which in combination with the cyclic motion exacerbates fatigue and causes the wires to break.

Another consequence of mounting wires from vibrating structures is that damping forces or driving forces can be coupled to the vibrating structures. Damping forces arise for example from (1) friction between wires or in some arrangements friction between the wires and adjacent structures (these frictional forces arise even when the insulating material on the wires is a synthetic resin polymer lubricating material such as is sold under the trademark Teflon), and (2) the internal structure of the material itself. Examples of driving forces include those which result from adjacent vibrating machinery. Coupling damping and driving forces to vibrating structures will alter the motion of the vibrating structures, which in many applications is an unacceptable consequence when unaltered vibrating motion of the structure is to be measured.

As an example of an attempt to compromise these problems, it has been known in the manufacture of Coriolis mass flow rate meters where flow tubes are continuously vibrated with respect to support structures that wires can be wrapped around the flow tubes from their base, where the flow tubes are solidly mounted to a support and not vibrated, up to locations on the vibrated flow tubes where the wires are connected to sensors and other electrical components. Wires can also be laid along the length of flow tubes and taped or glued to them.

Having wires wrapped or affixed, by tape or glue for example, to vibrating structures substantially precludes kinking problems because the wires are essentially kept in line and prevented from kinking by the structure to which they are mounted. As for the problem of fatigue, if the mechanical characteristics of the wires are at least equivalent to or even better than those of the vibrated structure, mechanical fatigue of the wires is a comparable engineering problem to that for the vibrated structure. However, these solutions, wrapping, taping or gluing, add additional mass to the flow tubes due to either the additional lengths in the conductors when wound around the flow tubes or the added tape and glue. This additional mass can alter the vibrating motion of the structure. In addition, because the effects of humidity and temperature on the glue and tape are not uniform, differential damping in the glue and tape can occur which can alter the vibrating motion of the structures. Thus, it would be advantageous to have an apparatus for electrically interconnecting vibrating structures that would provide for secure attachment of the conductors while minimizing the conductor length or the use of tape and glue.

Addressing the problem of minimizing the coupling of damping and driving forces to vibrating structures is a distinct problem from preventing kinking and fatigue. Continuing with the example of Coriolis mass flow rate meters, unless the wires are very light, such as 34 gauge and the structure about which it is wrapped is substantially more massive, such as a 2.54 centimeter (cm) diameter stainless steel flow tube having a 0.3 cm wall thickness, the magnitude of coupled forces to the vibrating structure cannot necessarily be ignored. Another factor which can exacerbate the problem of forces being coupled to vibrating structures arises when wires are wrapped or in some way attached to more than one portion of a vibrating structure because the damping forces or driving forces coupled to the two portions may not be the same. Therefore, the sum of the different forces can cause the structure to twist.

Reducing the gauge of the wire used, tailoring the insulation on wires to minimize stiffness and friction, and using the most flexible but still temperature insensitive wire possible are readily available considerations engineers can make when faced with the problem of transmission of electrical signals along conductors mounted between vibrating structures. However, these specification considerations alone will not always be sufficient. Accordingly, it is one object of the invention to provide a means for mounting wires between vibrating structures that will essentially minimize wire breakage and the coupling of damping and driving forces that can alter the motion of the vibrating structures. Another object of the invention is to be able to provide for secure attachment of the conductors to a vibrating structure while minimizing the conductor length or the use of tape and glue.

SUMMARY OF THE INVENTION

The invention set out and claimed here overcomes the deficiencies of prior methods for mounting wires between vibrating structures without compromising solutions for preventing wire breaking and coupling of forces to vibrating structures against each other and in particular to vibrating structures found in Coriolis mass flow meters.

All wires for conducting electrical signals from vibrating structures according to the apparatus of the present invention are transmitted using wires mounted at one end to one of the structures and mounted at the other end to the other structure with the sections of the wires between the mounted ends being maintained in free suspension. The wires are shaped in the space between their mountings in a semi-circular loop shape. The loop shape permits rolling motions for the wires about axes essentially perpendicular to the line between the locations on the structures where the wires are mounted. This loop shape and rolling motion prevents kinking and avoids bending which both accelerate fatigue and fracture.

To minimize coupling of any forces either damping or driving to vibrating structures the wires are mounted from the vibrating structure at essentially the axes defined by deflection of the vibrating structures. In particular, the deflection axes chosen are those having the shortest distances from the intersection on the structure of the deflection axes to where the wires must be connected to the electrical components on the structures. So mounting the wires minimizes the moment arms from the axes to the wires and therefore minimizes coupling of external force effects to the vibrating structures.

Previously, use of suspended semi-circular loop shapes for wires, and mounting wires adjacent deflection axes has been disclosed for Coriolis mass flow rate meters; see U.S. Pat. Application Ser. No. 770,590, Sensor Mounting for Coriolis Mass Flow Rate Meter, filed Aug. 29, 1985, and U.S. Pat. Application Ser. No. 770,573, High Temperature Coriolis Mass Flow Rate Meter, filed Aug. 29, 1985; both assigned to the assignee of the present invention.

Though use of flexible circuits in the form of flat flexible ribbon is disclosed in U.S. Pat. Application Ser. No. 770,590, continuously maintaining the half-loop shape of the suspended flexible circuit section remains a difficult task. If the half-loop shape is not continuously maintained, the suspended section can transition to another shape, such as an "S" shape. The transition to another shape or periodic transitioning between shapes will invariably cause kinking and fatigue as the flexible circuit is vibrated. It is a purpose of the present invention to assure continuous maintenance of only the semicircular shape for the flexible circuit.

A preferred embodiment for the present invention utilizes a flexible circuit with multiple conductors. Adjacent each end where the flexible circuit is mounted, the flexible circuit increases in width from the width in the region where the wires are maintained in the half-loop shape. The increased widths assures maintenance of the semi-circular loop shape thus preventing kinking and fatigue of the flexible circuit between the mounted ends. Alternate embodiments include providing the flexible circuit with a sheet metal layer or metallized layer that can be used to spot weld the flexible circuit to the vibrating structure.

BRIEF DESCRIPTION OF THE DRAWINGS

This and other advantages and novel features of the present invention will be more readily apprehended from the following detailed description when read in conjunction with the appended drawings, in which:

FIG. 4 is a sectional side view of a Coriolis mass flow rate meter with an embodiment of the present invention mounted on the meter;

Corresponding components are designated by the same reference numerals throughout the various figures.

DETAILED DESCRIPTION OF THE INVENTION

Application of the invention for use on Coriolis mass flow rate meters will be shown here. However, use on Coriolis mass flow rate meters only is not to be understood as a limitation for the use of the present invention. The invention can in fact, as would be understood in the art, be used on any electromechanical structure where electrical signals are to be transmitted between vibrating structures.

Figure 1:
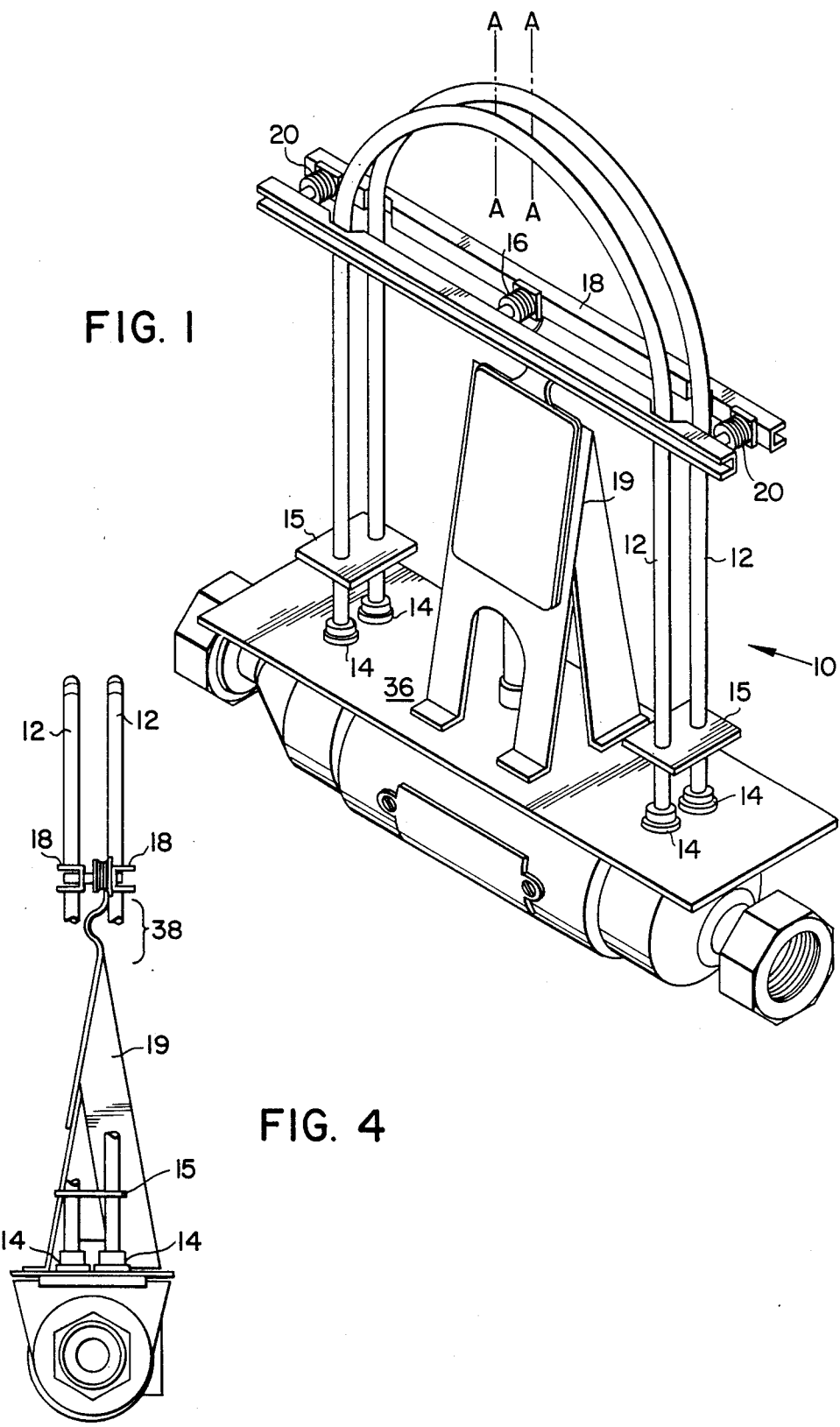
FIG. 1 is a perspective view showing an embodiment of the pre/sent invention as mounted on a Coriolis mass flow rate meter.

Use of the invention on a Coriolis mass flow rate meter 10 is shown in FIG. 1. The Coriolis mass flow rate meter 10, for purposes of understanding the present invention, includes two continuous flow tubes 12 which are driven to vibrate about their fixed mountings 14 and spacer plates 15 by a vibration driver 16. The components of the vibration driver 16 are connected to the flow tubes 12 by support bars 18. Also mounted on the support bars 18 are the components for two electrical sensors 20. These electrical sensors 20 respond to deflection of the flow tubes 12 about the A-A axes caused by fluid flow through the vibrating flow tubes 12. Therefore, coupling of damping and driving forces to the flow tubes 12 must be minimized.

Electrical signals have to be provided to the vibration driver 16 and must also be transmitted from the sensors 20. Prior to the present invention it was known that wires could be wrapped about the flow tubes 12 starting adjacent to the fixed mounting 14 up to the support bars 18 and then the wires were directed along the support bars 18 to the vibration driver 16 and sensors 20. Such routing of wires invariably causes damping forces to be transmitted to the vibrating flow tubes 12. These damping forces, which for example, can be caused by friction between the wires and the flow tubes 12, will change the amount of deflection of the flow tubes 12 about axes A—A. Changes in the amount of deflection caused by damping forces from wires are errors in measurements of fluid flow and have to be substantially minimized or eliminated. It has also been previously known to use half-loop shaped suspended wires, including flexible circuits, mounted from one of the support bars 18 to stationary support 19. However, assuring the maintainence of the half-loop shape when the flow tubes are vibrated or oscillated is a problem unaddressed by the prior art.

The present invention overcomes these and other deficiencies in the prior art. The invention uses a flexible circuit 22 (see FIG. 2) which can be built up from a synthetic insulating reinforcement layer 24 such as sold under the trademark Kapton (see FIG. 3) with rolled annealed copper conductors 26 on the reinforcement layer 24. Over the copper conductors 26 another synthetic insulating cover layer 28 can then be laid. The reinforcement and cover layers (24 and 28) are thin, for example, on the order of 0.12 to 2.5 thousandths of a centimeter, so as to be flexible. Accordingly, the copper conductors 26 are also very thin, for example, 3.5 thousandths of a centimeter.

Figure 5:
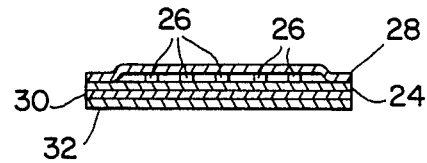
FIG. 5 is a sectional view of the flexible circuit of the present invention as shown in FIG. 2 taken along line 5—5.

The flexible circuit 22 can be mounted to the Coriolis mass flow rate meter 10 by use of a pressure sensitive external adhesive 30, as known in the art, which is laid down on the reinforcement layer 24 on those regions of the flexible circuit 22 where the flexible circuit 22 will be in contact with structures of the Coriolis mass flow rate meter 10 such as on the stationary support 19 or along the support bars 18. Prior to mounting the flexible circuit 22 a release liner 32, as is also known in the art, is laid over the pressure sensitive external adhesive 30 to protect it. (See FIG. 5).

Alternate means for fastening the flexible circuit to the support bar include providing a metalized layer or a thin sheet metal layer in lieu of or in conjunction with the adhesive layer 30. When used, the metalized layer could be secured to the support bar 18 by spot welding or soldering. Where both an adhesive layer and a metallized layer are used, the adhesive layer would be used to position the circuit until the spot welding or soldering was finished. Alternatively, the portions of the flexible circuit along the support bar 18 could be provided with holes through which screws, spot welded retainers or tabs, or other conventional fasteners could be inserted and which would extend into correspondingly positioned holes in the support 18.

For a preferred embodiment of the invention as used on the Coriolis mass flow rate meter 10, the electrical signals from the vibration driver 16 and sensors 20 on the Coriolis mass flow rate meter 10 are transmitted via flexible circuit 22 between a support bar 18 attached to a vibrating flow tube 12 and a stationary support 19 mounted on the base 36 of the Coriolis mass flow rate meter 10. The flexible circuit 22 is mounted so that a throat section 38 of the flexible circuit 22 in which the necessary number of copper conductors 26 are laid out substantially parallel to each other and as closely spaced from each other as is convenient is positioned or suspended in the space between the support bar 18 and the stationary support 19.

The length of the throat section 38 of the flexible circuit 22 is greater than the rectilinear distance between support bar 18 and the stationary support 19. Therefore, the throat section 38 will, as a first shape, form a half-loop between the support bar 18 and the stationary structure 19 (See FIG. 4). Other shapes could possibly be formed such as an "S" shape. All shapes other than a half-loop shape, however, are not preferred. For shapes other than the half-loop shape, care must be taken to assure that shape of the throat section 38 cannot transition between alternate shapes. For example, a S-shaped section could transition between the half-loop shape and its S-shape. Further, no sharp bends can be allowed to be formed along the length of the throat section 38 of the flexible circuit 22 because sharp bends when repeatedly vibrated by the relative motion between the stationary support 19 and the support bar 18 will lead to fatigue breaking of the copper conductors 26, the reinforcement layers 24, or both.

Figure 2:
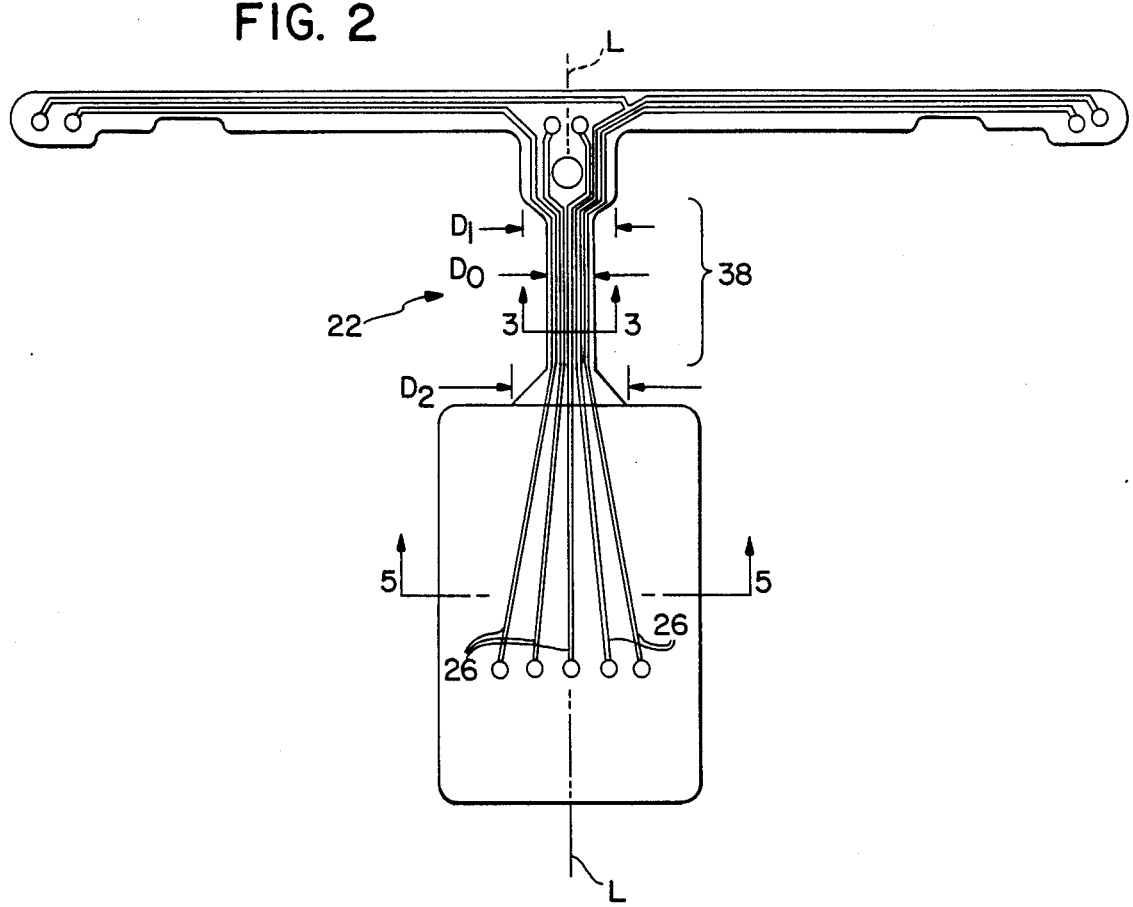
FIG. 2 is a front view of the flexible circuit of the present invention.
Figure 3:
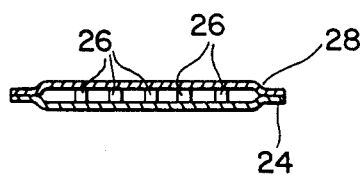
FIG. 3 is a sectional view of the flexible circuit of the present invention as shown in FIG. 2 taken along line 3—3.

The half-loop shape of the throat section 38 results in a rolling motion or a wave-like motion of the flexible circuit 22 as the support bar 18 moves with respect to the stationary support 19. We have discovered that to continuously maintain the half-loop shape and preclude sharp bends from forming in the regions adjacent the locations where the flexible circuit 22 is mounted, the widths, $D_1$ and $D_2$, of the portions of the suspended flexible circuit 22 are increased from the width, $D_0$, of the throat section 38 prior to the two locations where the flexible circuit 22 is fixedly mounted. This increases the stiffness of the flexible circuit 22 over that of the throat section 38. This increase in stiffness assures maintenance of the half-loop shape within the region of the throat section 38 and prevents sharp bending adjacent the mounting locations of the flexible circuit 22. The transition from width $D_0$ to width $D_1$ and that from width $D_0$ to width $D_2$ should not be abrupt but should be a gradual, smoothly, outwardly tapering area along each of the lateral edges of the flexible circuit 22 as shown in FIG. 2. Preferably, this outwardly tapering region occurs in an essentially symmetrical fashion about the longitudinal centerline L—L. With an abrupt transition at the points of attachment, the flexible circuit would flex like a hinge at the points of attachment which, in turn, would concentrate stress in a highly localized region that would fatigue the conductors. The increased stiffness, however, does not increase coupling of forces to the flow tube 12. The force components which result from the increased stiffness are directed to preventing sharp bending, such as would cause creasing, of the flexible circuit 22 adjacent the fixed mountings and maintaining of the half-loop shape that minimizes the coupling of forces to the flow tube 12. Coupling of forces to flow tube 12 is most effectively accomplished by flexible circuit 22 when the damping or driving forces are aligned parallel to the longitudinal axis L—L (see FIG. 2) of flexible circuit 22. This would result in a pulling or pushing of the flexible circuit 22 in a straight line. However, because of the half-loop shape in the region of the throat section 38, the flexible circuit 22 is prevented from aligning forces along longitudinal axis L—L of the flexible circuit 22.

The above discussion and related illustrations of the present invention are directed primarily to preferred embodiments and practices of the invention. However, it is believed that numerous changes and modifications in the actual implementation of the concepts described herein will be apparent to those skilled in the art, and it is contemplated that such changes and modifications may be made without departing from the scope of the invention as defined by the following claims.

What is claimed is:

1. In a Coriolis mass flow meter which comprises a flow tube, mounting means for said flow tube, means for vibrating said flow tube with respect to said mounting means and means for sensing the deflection of said flow tube caused by fluid flow through said flow tube and for producing a signal representative of said deflection, support structure means mounted adjacent said flow tube for supporting said means for vibrating and said means for sensing;

a flexible circuit device attached to said support structure means and said mounting means and including affixed multiple electrical conductors for electrically interconnecting said means for vibrating and said means for sensing between said support structure means and said mounting means, which device further comprises:

(a) flexible insulating means affixed to said multiple electrical conductors for maintaining them in essentially parallel relationships in a plane over a first distance along the length of said electrical conductors, which first distance is greater than the rectilinear distance between said mounting means and said support structure means; and (b) stiffening means affixed to said insulating means at each end of said first distance and extending essentially to each of the locations where said device is attached to said mounting means and said support structure, which stiffening means act to maintain said first distance of said flexible circuit device in essentially a half-loop shape after said device is attached to said mounting means and said support structure.

2. The apparatus according to claim 1 wherein said stiffening means comprises maintaining an essentially constant first width for said insulating means across said plane and along said first distance except at both ends where said first width increases prior to the locations where said device is attached to said mounting means and said support structure means.

3. The apparatus according to claim 2 wherein the said increases in said first width about said ends are substantially symmetrical, smoothly outwardly tapering increases about a centerline of said plane extending between said ends.

4. The apparatus according to claim 2 further comprising means for mounting said device to said mounting means and said support structure means in a fixed relationship.

5. The apparatus of claim 4 wherein the means for mounting said device is an adhesive layer provided on said device coincident to the locations where said device is attached to said mounting means and said support structure means.

6. The apparatus of claim 4 wherein the means for mounting said device is a metal layer provided on said device coincident to the locations where said device is attached to said mounting means and to said support structure means whereby said metal layer can be spot welded to said mounting means and said support structure means.

7. The apparatus according to claim 3 further comprising means for mounting said device to said mounting means and said support structure means in a fixed relationship.

8. The apparatus of claim 7 wherein the means for mounting said device is an adhesive layer provided on said device coincident to the locations where said device means is attached to said mounting means and said support structure means.

9. The apparatus of claim 7 wherein the means for mounting said device is a metal layer provided on said device coincident to the locations where said device is attached to said mounting means and to said support structure means whereby said metal layer can be spot welded to said mounting means and said support structure means.

10. In a Coriolis mass flow meter which comprises a flow tube, mounting means for said flow tube, means for vibrating said flow tube with respect to said mounting means and means for sensing the deflection of said flow tube caused by fluid flow through said flow tube and for producing a signal representative of said deflection, support structure means mounted adjacent said flow tube means for supporting said means for vibrating and said means for sensing;

a flexible circuit device attached to said support structure means and said mounting means and including affixed multiple electrical conductors for electrically interconnecting said means for vibrating and said means for sensing between said support structure means and said mounting means, which device further comprises:

(a) flexible insulating means, affixed to said multiple electrical conductors, for maintaining them in essentially parallel relationships in a plane over a first distance along the length of said electrical conductors which is greater than the rectilinear distance between said mounting means and said support structure means;

(b) stiffening means affixed to said insulating means at each end of said first distance and extending essentially to each of the locations where said device is attached to said mounting means and said support structure, which stiffening means (i) acts to maintain said insulating means at an essentially constant first width across said plane and along said first distance except at each end where said first width increases in a gradual, smoothly outwardly tapering manner to a substantially greater width at the locations of attachment to said mounting means and said support structure means and (ii) further acts to maintain said first distance of said device in essentially a half-loop shape after said device is attached to said mounting means and said support structure;

and, (c) adhesive mounting means for fixedly attaching said device to said mounting means and said support structure means.

* * * * *